United States Patent [19]
Hottovy et al.

[11] Patent Number: 6,042,790
[45] Date of Patent: Mar. 28, 2000

[54] APPARATUS FOR MAINTAINING UNREACTED MONOMER CONCENTRATION IN A POLYMERIZATION REACTOR

[75] Inventors: John D. Hottovy, Houston; Frederick C. Lawrence, League City; Nelson T. Black, Pasadena, all of Tex.

[73] Assignee: Phillips Petroleum Company, Bartlesville, Okla.

[21] Appl. No.: 08/328,179

[22] Filed: Oct. 24, 1994

Related U.S. Application Data

[62] Division of application No. 08/014,934, Feb. 8, 1993, Pat. No. 5,387,659.

[51] Int. Cl.$^7$ ........................................... C08F 2/00
[52] U.S. Cl. ..................... 422/131; 422/110; 526/59; 526/60
[58] Field of Search ................. 526/59, 60; 422/110, 422/131

[56] References Cited

U.S. PATENT DOCUMENTS

| | | | |
|---|---|---|---|
| 3,635,919 | 1/1972 | Goffinet | 526/60 |
| 4,469,853 | 9/1984 | Mori | 526/59 |

*Primary Examiner*—David W. Wu
*Attorney, Agent, or Firm*—Ryan N. Cross

[57] ABSTRACT

In a polymerization process utilizing a high pressure flash to separate polymer from unreacted monomer contained in the effluent stream from the reactor, the concentration of unreacted monomer in the reaction effluent is determined by withdrawing from the reactor an effective analyzing amount of effluent, exposing the amount to a low pressure flash and analyzing the vaporized portion to determine the concentration of monomer.

7 Claims, 2 Drawing Sheets

APPARATUS FOR MAINTAINING UNREACTED MONOMER CONCENTRATION IN A POLYMERIZATION REACTOR

This application is a Division of application Ser. No. 08/014,934, now U.S. Pat. No. 5,387,659.

BACKGROUND

This invention relates to process control. In one aspect this invention relates to a method and apparatus for maintaining a desired unreacted monomer concentration in a polymerization reactor.

In a typical polymerization reaction, monomer, diluent and catalyst are fed to a reactor where the monomer is polymerized. The diluent does not react but is typically utilized to control solids concentration and also to provide a convenient mechanism for introducing the catalyst into the reactor. The reactor effluent, a mixture of polymer, diluent and unreacted monomer, is removed from the reactor and fed to a flash tank where the polymer is separated from the diluent and unreacted monomer. Typically, catalyst will be contained in the polymer.

It is important to control the concentration of the unreacted monomer within the reactor because some of the properties of the polymer produced, such as melt index, are highly dependent on the unreacted monomer concentration. Typically, the unreacted monomer concentration has been controlled by manipulating the monomer feed rate, the diluent feed rate, or the catalyst feed rate.

Additionally, for economical operation it is desirable that the unreacted monomer in the reactor effluent be recovered and recycled to the polymerization reactor. Processes for the recovery and recycling of the diluent have been disclosed in U.S. Pat. Nos. 3,639,374 and 4,424,341. Such processes are generally one-stage flash processes with a low pressure recovery of the monomer and diluent after the flashing, a one-stage flash process with a high pressure recovery of the diluent and the monomer within the reactor after the flashing, or a two-stage flash process with the recovery of a major portion of the monomer and diluent after the high pressure flash while the diluent and monomer are still at a sufficient pressure to avoid needing recompression.

In a one-stage flash process with a low pressure recovery, a slurry of polymer and diluent is collected in one or more settling legs of the polymerization reactor. Next the slurry is discharged to a flash vessel wherein the mixture is flashed to a low pressure such as about 20 psia. While the flashing results in substantially complete removal of the diluent and monomer from the polymer, it is necessary to recompress the vaporized diluent and monomer in order to be able to condense them to liquid suitable for recycling to the polymerization reactor. The cost of recompression and the utilities for its operation often amounts to a significant portion of the expense involved in producing the polymer.

When a high pressure flash is utilized, recovery of the diluent and monomer after the high pressure flash reduces the need for recompression of the vaporized diluent and monomer before recycling to the polymerization reactor. Thus, the use of a high pressure flash results in a reduction of the expense involved in producing the polymer. In a one-stage flash with low pressure recovery, direct sampling of the monomer and diluent gas gives accurate analysis of the amount of monomer in the polymerization reactor. However, when a high pressure flash recovery is utilized, a significant portion of the monomer is retained with the polymer solids so that a direct sampling of the gases from the high pressure flash tank will result in an inaccurate analysis of the amount of monomer in the polymerization reactor. Thus, it would be desirable to develop an accurate system of determining the amount of monomer in the polymerization reactor for a polymerization system using a high pressure flash, in order to control the concentration of the unreacted monomer in the polymerization reactor and, also, realize the cost benefits associated with utilizing a high pressure flash.

SUMMARY OF THE INVENTION

It is therefore an object of the present invention to provide a method and apparatus capable of accurate analysis of the amount of monomer in the polymerization reactor when a high pressure flash tank is utilized for monomer recovery.

In accordance with the present invention a method and apparatus for polymerizing a monomer in a polymerization reactor is provided wherein a polymerization effluent containing polymer and unreacted monomer is withdrawn from the polymerization reactor with a major part of the effluent being sent to a flash vessel for separation of the polymer from the monomer at a pressure above about 100 psig and an effective analyzing amount of the polymerization effluent being sent to a low pressure flash vessel for flash separation at a pressure below about 75 psig to produce a low pressure polymer portion and a low pressure monomer portion. The low pressure monomer portion is analyzed to produce a signal representative of at least one condition in the polymerization reactor and the conditions in the reactor are manipulated in response to the signal.

DETAILED DESCRIPTION OF THE INVENTION

Figure 1:
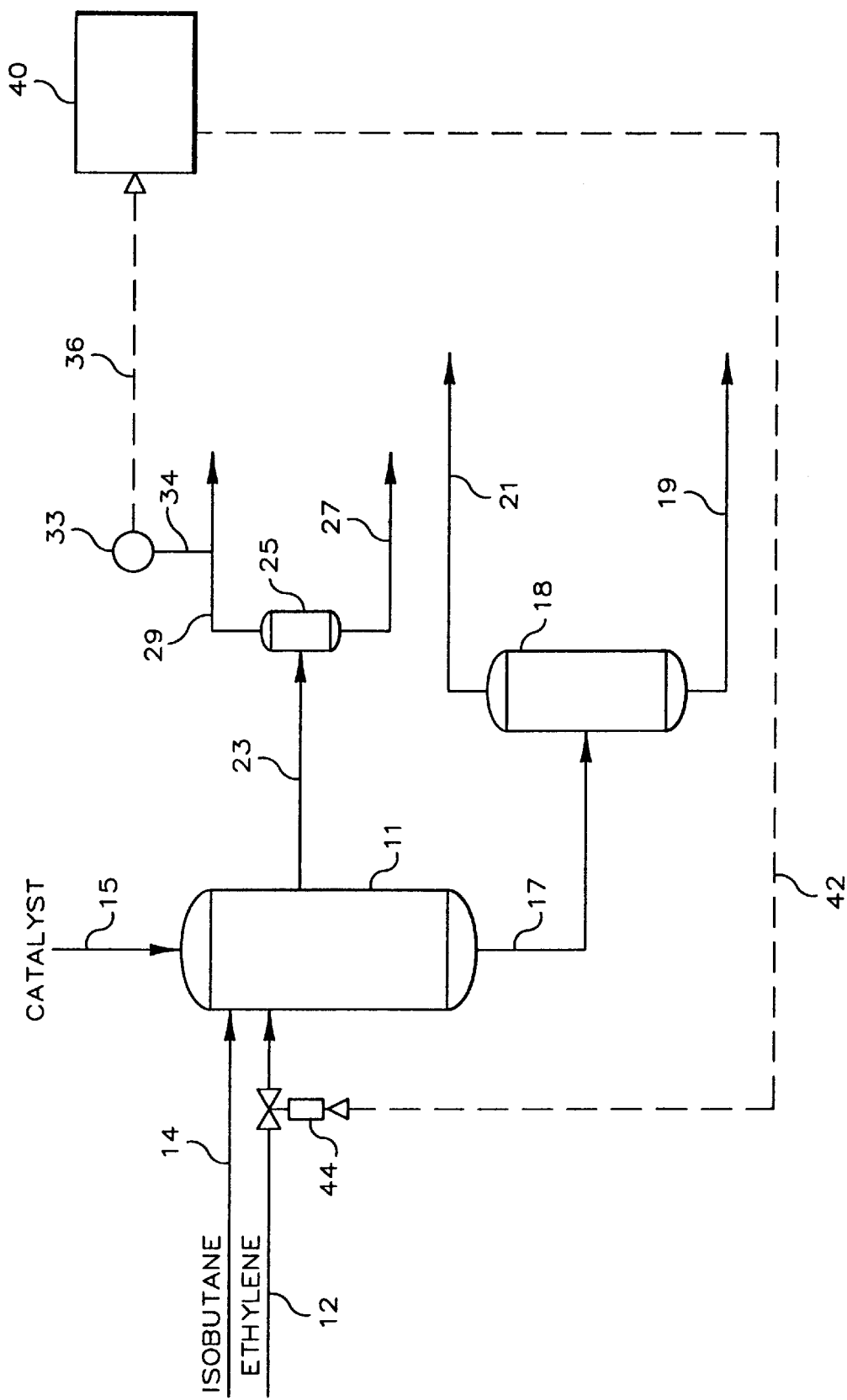
FIG. 1 is a diagrammatic illustration of an embodiment of a polymerization reaction and recovery system which utilizes the present invention.

The invention is described in terms of the polymerization of ethylene. However, the invention is applicable to any polymerization process where it is desired to control the unreacted monomer concentration.

Lines designated as signal lines in the drawings are electrical or pneumatic in these embodiments. Generally, the signals provided from any transducer are electrical in form. However, the signals provided from flow sensors will generally be pneumatic in form. Transducing of these signals is not illustrated for the sake of simplicity because it is well known in the art that if flow is measured in pneumatic form it must be transduced to electrical form if it is to be transmitted in electrical form by a flow transducer. Also, the transducing of the signals from analog form to digital form or from digital form to analog form is not illustrated because such transducing is well known in the art.

The invention is applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within scope of the invention.

Referring now to FIG. 1, there is illustrated a polymerization reactor 11. Ethylene, and optionally a comonomer, such as hexene-1, is provided to polymerization reactor 11 through conduit means 12. In like manner, a diluent such as isobutane is provided to the polymerization reactor 11 through conduit means 14 and a catalyst, such as chromium oxide on silica catalyst or silica-titania catalyst, is provided to the polymerization reactor 11 through conduit means 15.

The majority of the reaction effluent is removed from the reactor 11 through conduit means 17 and is provided to the flash tank 18. The reaction effluent will be comprised of polyethylene, unreacted ethylene, and isobutane. Catalyst will generally be contained in the polyethylene.

The polyethylene is separated from the unreacted ethylene and the isobutane in the flash tank 18. Polyethylene is removed from high pressure tank 18 through conduit means 19. Unreacted ethylene and isobutane are removed from the flash tank 18 through conduit means 21.

Within flash tank 18 the reaction effluent is exposed to a pressure drop. The pressure drop is such that a major portion of diluent and monomer will be vaporized. Vaporization can occur at least partially within conduit 17. The pressure in flash tank 18 will vary depending on the nature of the diluent and monomer and the temperature selected. Typically, pressures above about 100 psig can be employed. Preferably, pressures in the range from about 100 to about 300 psig will be utilized; more preferably, from 200 to 250 psig. In contrast, polymerization systems utilizing only a low pressure flash tank will typically utilize pressures in the range of 0 psig to 75 psig.

Polyethylene removed from the flash tank 18 through conduit means 19 will be treated to remove any remaining monomer and diluent. Such treatments can include a second flash in a low pressure flash tank and/or drying in a conventional dryer.

Diluent and monomer are removed as vapor from flash tank 18 via conduit 21 and subsequently condensed without compression by heat exchange with a heat exchange fluid in a heat exchanger (not shown). The diluent and monomer can then be returned to reactor 11.

An effective analyzing amount of reaction effluent is removed via conduit 23 from reactor 11. Optionally, an effective analyzing amount of reactor effluent can be taken from conduit 17; however, direct removal from the reactor is preferable. Typically, an effective analyzing amount will be a minor volume proportion of the amount of effluent produced by the polymerization reactor. For example, a polymerization system that produces effluent containing on the order of 35,000 lbs/hr of polymer, and 30,000 lbs/hr diluent and monomer would typically have a sample size of from about 20 lbs/hr to about 100 lbs/hr, with about 35% of the sample being polymer. Preferably, such a sample would be from about 20 lbs/hr to about 40 lbs/hr.

The reaction effluent removed through conduit means 23 is provided to low pressure flash tank 25. Low pressure flash tank 25 will typically operate with the pressure below about 75 psig; preferably at a pressure in the range of about 0 psig to about 30 psig, and most preferably from 0 psig to 10 psig. In flash tank 25 vaporization of the monomer and diluent occurs; however, vaporization can also occur at least partially within conduit 23. In flash tank 25 a more complete separation between the polyethylene and the unreacted ethylene and isobutane occurs than is achieved in high pressure flash tank 18.

Low pressure flash tank 25 need not have the volume capacity of the high pressure flash tank because it will only be flashing an effective analyzing amount of reaction effluent. Typically, low pressure flash tank 25 will have a volume capacity of from about 2 to about 5 cubic feet.

Polyethylene is removed from flash tank 25 through conduit means 27. Unreacted ethylene and isobutane are removed from flash tank 25 through conduit means 29. A sample of the fluid flowing through conduit means 29 is provided to analyzer transducer 33 through conduit means 34. The remaining fluid flowing through conduit 29 can be compressed and recycled back to the polymerization reactor if desired.

The analyzer transducer 33 is preferably a chromatographic analyzer. The analyzer transducer 33 provides an output signal 36 which is representative of the concentration of ethylene in the fluid flowing through conduit 29. Essentially, signal 36 is representative of the concentration of unreacted ethylene removed from reactor 11. Signal 36 is provided from the analyzer transducer 33 as an input to computer 40. In response to signal 36, computer 40 determines the concentration of unreacted ethylene in reactor 11 and determines whether adjustment of the in flowing ethylene monomer is needed. If adjustment is needed, then computer 40 sends a signal 42 to valve 44. Valve 44 controls the flow of ethylene through conduit 12 and into reactor 11.

Different control systems for computer 40 are known in the art such as those disclosed in U.S. Pat. Nos. 4,543,637 and 4,628,034; the disclosures of which are hereby incorporated by reference.

Additionally, instead of adjusting monomer feed through conduit 12 the system also could be set up so that diluent feed through conduit 14 or catalyst feed through conduit 16 are adjusted in response to a signal from computer 40.

Figure 2:
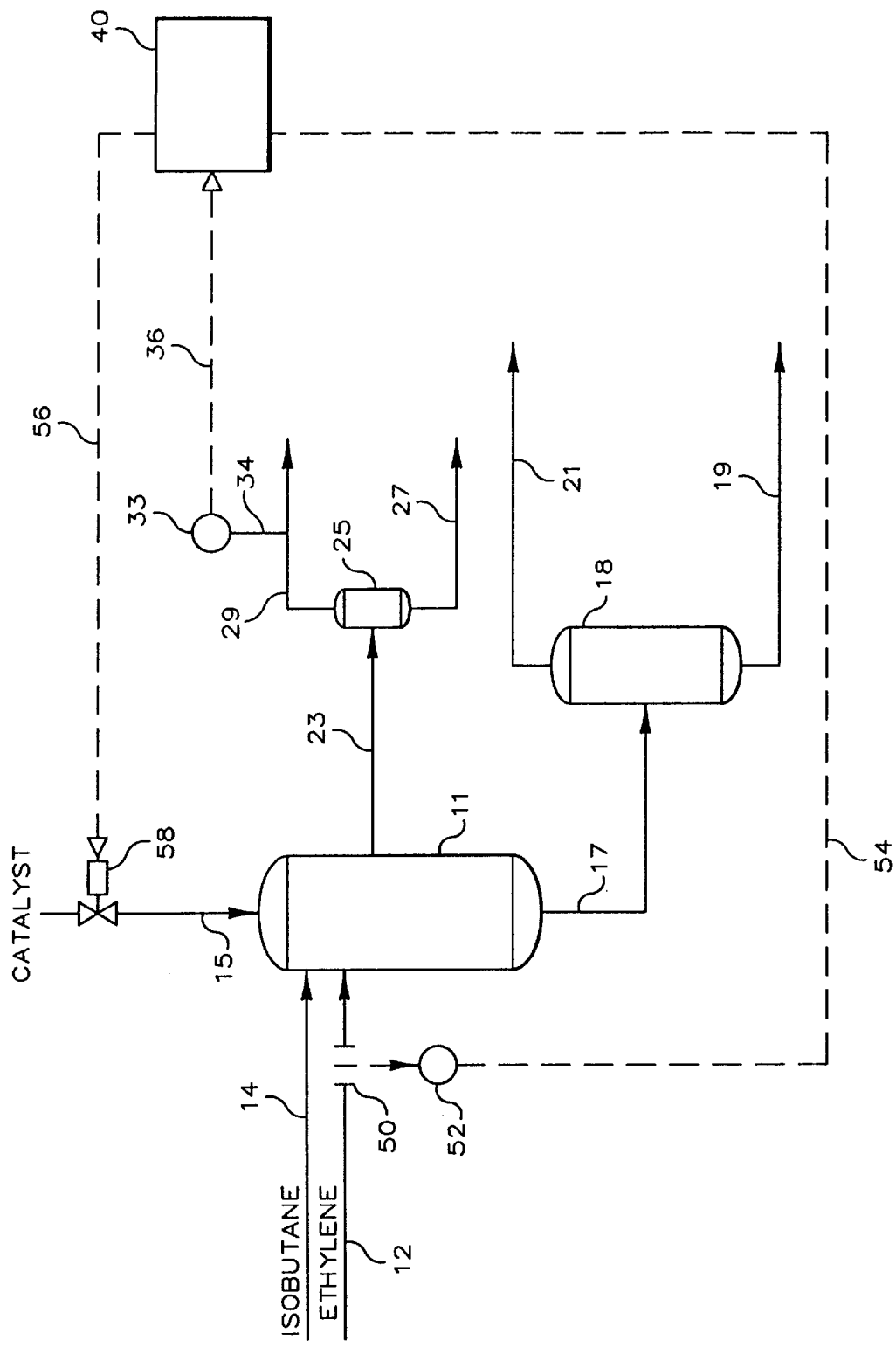
FIG. 2 is a diagrammatic illustration of an alternative embodiment of a polymerization reaction and recovery system which utilizes the present invention.

Referring now to FIG. 2, an embodiment where catalyst feed is adjusted in response to a signal from computer 40 is shown. The embodiment of FIG. 2 operates similarly to that of FIG. 1, except that conduit means 12 has sensor 50 which is in communication with transducer 52, and conduit 15 has a valve 58 which regulates catalyst flow through conduit 15.

Flow transducer 52, in combination with flow sensor 50, which is operably located in conduit means 12, provides an output signal 54 which is representative of the flow rate of ethylene through conduit means 12. Signal 54 is provided from the flow transducer 52 as an input to computer 40.

In response to signal 54, from transducer 52, and signal 36, from analyzer transducer 33, the computer provides output signal 56, which is representative of the desired catalyst feed rate. In response to signal 56, valve 58 is adjusted to feed the appropriate amount of catalyst to reactor 11.

Typically, valve 58, located in conduit means 15, will be a ball check feeder or shot feeder. The valve fills with a mixture of catalyst and diluent Periodically, the catalyst feeder valve 15 is actuated so this mixture is dumped into reactor 11. The catalyst feeder valve 15 is then recycled to a closed position and is refueled in preparation for the next actuation.

When valve 58 is a feeder valve, valve 58 will dump catalyst in response to signal 56. Thus, the computer determines the correct period between catalyst dumps necessary to maintain the desired amount of monomer within the reactor and sends signal 56 at the end of the period.

In operation, care must be taken to prevent plugging of conduit 23 by the buildup of polymer. To prevent such plugging, conduit 23 should not be pocketed and preferably, it should be sloped at an angle toward flash tank 25 so that conduit 23 has no horizontal runs. Preferably, conduit 23 would be sloped downward at an angle between about 45° toward flash tank 25.

While the invention has been described in terms of the presently preferred embodiment, reasonable variations and modifications are possible by those skilled in the art and such variations are within the scope of the described invention and the appended claims.

That which is claimed is:

1. Apparatus comprising:

a polymerization reactor, means for providing monomer to said polymerization reactor, means for providing catalyst to said polymerization reactor, means for removing the reaction effluent containing polymer and unreacted monomer from said polymerization reactor, first flash separation means for receiving a major portion of said reaction effluent and flash separating said unreacted monomer from said polymer at a pressure above about 100 psig;

second flash separation means for receiving a minor portion of said reaction effluent and flash separating said unreacted monomer from said polymer at a pressure below about 75 psig, means for analyzing said monomer separated from said minor portion of said reaction effluent to produce a signal representative of at least one condition in the polymerization reactor, means for manipulating at least one condition in said polymerization reactor in response to said signal.

2. An apparatus according to claim 1 wherein said flash separation in said second flash separation means occurs at a pressure in the range of from 0 psig to 10 psig.

3. An apparatus according to claim 1 wherein said means for analyzing said monomer comprises an analyzer transducer and a computer.

4. An apparatus according to claim 1 wherein said signal is representative of the concentration of monomer in said polymerization reactor.

5. An apparatus according to claim 1 wherein said means for manipulating changes the rate that monomer is provided to said polymerization reactor.

6. An apparatus according to claim 1 wherein said means for manipulating changes the rate that catalyst is provided to said polymerization reactor.

7. An apparatus according to claim 1 wherein said minor portion of said reaction effluent is an effective analyzing amount.

* * * * *